United States Patent
Hains et al.

(10) Patent No.: US 6,724,500 B1
(45) Date of Patent: Apr. 20, 2004

(54) PIECEWISE COLOR TRANSFORMATION BY GAMUT PARTITIONING

(75) Inventors: Charles M. Hains, Altadena, CA (US); Robert R. Buckley, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/450,799

(22) Filed: Nov. 29, 1999

(51) Int. Cl.$^7$ ................................................. G03F 3/08
(52) U.S. Cl. ...................... 358/1.9; 358/518; 358/525; 382/167
(58) Field of Search .................. 358/1.9, 518, 523, 358/525; 382/162, 166, 167

(56) References Cited

U.S. PATENT DOCUMENTS

| | | | |
|---|---|---|---|
| 4,275,413 A | * 6/1981 | Sakamoto et al. | 358/525 |
| 4,500,919 A | 2/1985 | Schreiber | 358/78 |
| 5,254,978 A | 10/1993 | Beretta | 345/150 |
| 5,377,025 A | 12/1994 | Spaulding et al. | 358/518 |
| 5,390,035 A | 2/1995 | Kasson et al. | 358/518 |
| 5,553,199 A | * 9/1996 | Spaulding et al. | 358/1.9 |
| 5,574,666 A | 11/1996 | Ruetz et al. | 364/526 |
| 5,704,026 A | 12/1997 | Wan | 395/131 |
| 5,900,952 A | 5/1999 | Fan | 358/518 |
| 6,421,140 B1 | * 7/2002 | Hui | 358/1.9 |

OTHER PUBLICATIONS

Buckley, Robert Roy Jr., "Reproducing Pictures with Non–reproducible Colors," Thesis submitted in partial fulfillment of Degree of Master of Science, Massachusetts Institute of Technology, 1978.

Hardeberg, J. Y. et al., "Color Printer Characterization Using a Computational Geometry Approach," Modified version of a paper submitted at IS&T and SID's 5$^{th}$ Color Imaging Conference, Scottsdale, Arizona, Nov. 1997 [retrieved on Nov. 3, 1999]. Retrieved from the internet: http://www–i–ma.enst.fr/~hardeber/work/CIC1997/cic1997.html.

\* cited by examiner

*Primary Examiner*—Thomas D. Lee
(74) *Attorney, Agent, or Firm*—Fay, Sharpe. Fagan, Minnich & McKee, LLP (57) ABSTRACT

A method for selecting CMY coordinates for printing a desired source color represented in an source color-space includes the step of obtaining coordinates for the printer gamut in the source color-space and then dividing the printer gamut into a plurality of tetrahedra, one of which contains the desired source color. This particular tetrahedron, referred to as the source-bearing tetrahedron, is identified and transformed into a target-bearing tetrahedron in the CMY color space. The target-bearing tetrahedron contains the CMY coordinates of the desired color. The specific color within the target-bearing tetrahedron is identified by obtaining barycentric coordinates for the source color relative to the source-bearing tetrahedron and identifying that color in the target-bearing tetrahedron that has the same barycenric coordinates. The CMY coordinates for that color can then be provided to a printer to print the desired source color.

23 Claims, 11 Drawing Sheets

PIECEWISE COLOR TRANSFORMATION BY GAMUT PARTITIONING

This application is related to the field of color reproduction, and more specifically, to methods and systems for mapping from an additive color-space associated with a display to a subtractive color-space associated with a printer. The application describes an invention for use with digital color printers such as xerographic and ink-jet printers.

BACKGROUND

At the very least, a color printer is expected to reproduce on paper the colors that appear on a display monitor. A fundamental difficulty inherent in this task is that a display monitor generates color by illuminating combinations of red, green, and blue phosphors on a screen, whereas a printer generates color by depositing selected amounts of cyan, magenta, and yellow inks on paper. To accurately reproduce a screen color on paper, it is therefore necessary to determine, for each location on the display, what mixture of inks on paper corresponds to a particular combination of phosphors on the display. This process of determining how to represent the same color on two different media is referred to as a transformation from one "color space" to another.

A display monitor generates colors by forming a linear combination of three primary colors. For most display monitors, the three primary colors are red, green, and blue. However, any three colors can be used as primary colors provided that no primary color can be generated by a combination of the other two primary colors.

The color space associated with a display monitor is thus an additive color-space. An additive color-space is roughly analogous to a linear vector space in which the three primary colors form a basis and the color is a vector represented in terms of that basis. Because additive color-spaces are analogous to linear vector spaces, given the representation of a color in terms of one basis, one can easily represent the color in terms of a different basis by performing a matrix transformation.

Throughout this specification, we refer to the color space associated with the display as a "source color-space." This color space can be an RGB color-space. However, it is common to transform the RGB color-space into a perceptually uniform space in which the distance between any two colors is indicative of the subjective perceptual difference between those two colors. An example of such a color space is the CIEL*a*b* color-space.

It would appear, based on the foregoing, that the problem of determining the ink mixture corresponding to a particular color in the source color-space is no more difficult than performing a matrix transformation. However, this assumes that the color space associated with the printer is also an additive color-space. It is not.

In contrast to the phosphors of a display monitor, an ink generates color by taking away selected colors that are already present. This is easily demonstrated by comparing the result of placing a spot of yellow ink on a black piece of paper with the result of placing a spot of ink on a white piece of paper. In the latter case, the white paper reflects all colors present in that light and the yellow ink suppresses the reflection of all but the yellow component of the incident light. In the former case, the black paper does not reflect any of the colors in the incident light. Hence, there is nothing for the yellow ink to suppress.

Unlike the additive source color-space associated with the display monitor, the color space associated with the printer is a subtractive color-space. An additional difficulty is introduced by the fact that printer inks absorb colors other than their nominal colors. In general, the transformation from an additive color-space to a subtractive color-space is non-linear and cannot be accomplished by a matrix transformation.

Conventional methods for performing a color transformation between colors in an additive color-space and corresponding colors in a subtractive color-space rely on a color-transformation table. In such methods, one determines the additive color combination to be reproduced, locates that combination on the table, and reads the appropriate mixture of inks that best reproduces that color. Since it is generally impractical to include every possible combination of additive primary colors in a color-transformation table, there are many instances in which a particular combination of additive primary colors combination is not listed. When this occurs, the conventional method interpolates the appropriate ink mixture on the basis of the ink mixtures associated with nearby combinations of additive primary colors.

In order to generate a color-transformation table, it is necessary to make colorimetric measurements for each ink mixture listed on the table. Since color-transformation tables generally include over a thousand distinct colors, the creation of a table is a daunting task. In most cases, a color-transformation table is generated only once, with a typical printer operating under normal conditions. Such a table cannot easily accommodate small manufacturing differences between individual printers, changes in performance of a printer as it ages, changes in the properties of ink over time, and the changes in the environmental conditions in which the printer operates. These changes result in subtle variations in color that are not readily accommodated by a single table. Although, in principle, these variations can be accommodated by generating a new color-transformation table, the number of colorimetric measurements required to do so makes this an impractical option.

The range of colors, or "gamut," that can be printed defines a three-dimensional solid in the CMY color-space. The resulting solid is referred to as the printer gamut. The source gamut does not, in general, define a cube in the source color-space. Nevertheless, a conventional color-transformation table samples the printer gamut within a regular grid of points in the CMY color-space. This sampling scheme which would be appropriate if the printer gamut were a cube, results in a quantization error at the printer gamut boundary when the printer gamut is an irregular solid in the source color-space. This error results in clipping, or truncation, for colors outside the quantitized printer gamut boundary.

In some cases, the color image to be reproduced has a greater dynamic range than the color printer is capable of printing. This may occur, for example, when the image is a photograph. A related problem arises when the gamut of colors to be reproduced is different from that provided by the printer. For example, a computer monitor can display many bright secondary colors that cannot be reproduced in a subtractive color-space. In both these cases, the image to be reproduced must have its gamut compressed so that all colors to be reproduced are within the printer gamut. This need to perform gamut compression raises the question of how to select a target color within the printer gamut to correspond to an out-of-gamut color in the source image. Known methods for performing gamut compression agree that it is desirable for the target color in the printer gamut to have the same hue angle as the source color in the source image. Many known methods also agree that it is preferable to reduce lightness before reducing chroma. Other known methods of performing gamut compression map the out-of-gamut color to the closest point that lies within the printer gamut. These methods rely on precise knowledge of the gamut boundary. However, in modeling the geometry of a printer gamut, these methods do not take into account the highly irregular geometry of the printer gamut.

SUMMARY

The method and system of the invention relies on the observation that although the mapping from an additive color-space to a subtractive color-space is non-linear, the mapping from a limited portion of the additive color-space to a corresponding limited portion of the subtractive color-space is approximately linear. In effect, the mapping between the two color spaces is globally non-linear but piecewise linear. As a result, it is possible to partition the printer gamut into a plurality of volumes and to map only the boundaries of those volumes. Once the mapping of the boundaries is performed, the interior points are assumed to map linearly so that the coordinates of the interior point in a coordinate system local to the volume being mapped remains the same before and after the mapping.

A method for implementing a color mapping in accordance with the principles of the invention includes the step of transforming the printer gamut, which is in a subtractive color-space, to an equivalent printer-gamut in an additive color-space. This equivalent gamut is then partitioned into a plurality of non-overlapping constituent volumes, each of which has a common boundary point. The method then searches for a constituent volume that contains the source color within it. If this constituent volume is found, it is designated as the source-bearing volume. The method then identifies a corresponding target-bearing volume in the subtractive color-space and identifies a target color in that target-bearing volume-that corresponds to the source color in the source-bearing volume.

The gamut transformation step is generally performed by instructing the printer to print samples of selected colors and then performing colorimetric measurements on those volumes with a calorimeter or similar device. Since the output of the colorimeter is in an additive color-space, the effect is to transform the subtractive color-space of the printer into an additive color-space.

In a preferred embodiment, the constituent volumes are tetrahedra having a common vertex at a point on the neutral axis of the equivalent gamut. The number of tetrahedra is preferably twenty-four, however an embodiment with only twelve tetrahedra is suitable for applications in which processing power is limited.

The step of identifying a point in the target-bearing volume that corresponds to the source color in the source-bearing volume can be accomplished by obtaining barycentric coordinates of the source color in the source-bearing volume and selecting that point in the target-bearing volume that has the same barycentric coordinates relative to the target-bearing volume.

In some cases, the source color will be such that none of the constituent volumes in the equivalent gamut will contain it. In such cases, the method of the invention also includes the step of performing a gamut compression in order to map selected points in the CMY color-space to a corresponding point in a compressed printer-gamut. This is accomplished by defining a maximum surface envelope enclosing the printer gamut and mapping all source points within the maximum surface envelope into the compressed printer-gamut by means of a compression function. In the preferred embodiment, the compression function is a fourth-degree polynomial with coefficients selected to satisfy constraints on the properties of the mapping at selected points in the gamut.

These and other features of the invention, together With a preferred embodiment thereof, will be apparent from an inspection of the following detailed description and the accompanying figures in which:

DETAILED DESCRIPTION

Figure 1:
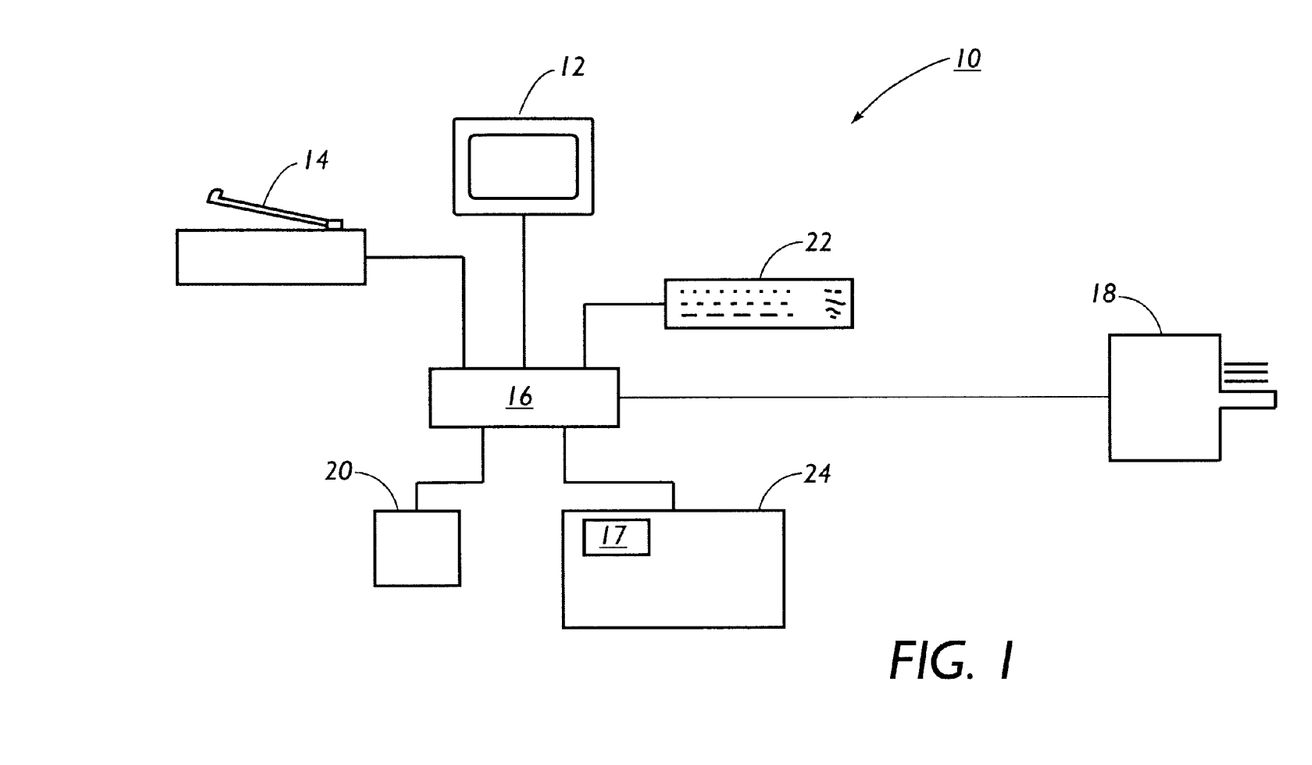
FIG. 1 is an image-reproduction system for implementing the method of the invention.

An image reproduction system 10 for practice of the invention, as shown in FIG. 1, includes one or more image sources for a color image to be printed. A typical source for a color image is a display monitor 12 or a scanner 14, both of which are capable of providing, for each element of an image, source-color coordinates of a source color to be associated with that element. The source color-space in which these source-color coordinates are provided is, in most cases, an RGB color-space. Because of the advantages of representing colors in a device-independent space, it is common to transform RGB color coordinates into CIEL*a*b* color coordinates. Because both RGB and CIEL*a*b* can be related to CIE values by defined equations, the transformation between them is relatively straightforward. Throughout this specification, we refer to the source color-space as a CIEL*a*b* color-space. However, it is to be understood that any source color-space can be used to practice the invention.

The display monitor 12 and the scanner 14 are in communication with a processor 16 capable of implementing a color-correction system 17 for transforming the source-color. coordinates provided by the display monitor 12 (or the scanner 14) into target-color coordinates that are reproducible by a printer 18, also in communication with the processor 16. Because the printer 18 reproduces color by mixing inks, the target-color coordinates represent color in a subtractive color-space. In most cases, this subtractive color-space is a CMY color-space. For this reason, we refer to the target-color coordinates as being in the CMY color-space throughout this specification. It is to be understood, however, that any subtractive color-space can be used in the practice of this invention.

The color-correction system 17 for executing the color transformation from the CIEL*a*b* color space to the CMY color-space is stored in a storage element, such as a non-volatile storage medium 20, in communication with the processor 16. Upon instructions from a user, who communicates with the processor 16 by means of an input device 22, the color-correction system 17 is loaded into a volatile memory element 24 in order to facilitate rapid access by the processor 16. In most cases, the non-volatile storage medium 20 is a hard drive, the volatile memory element 24 is a random access memory, and the input device 22 is a keyboard or a combination of a keyboard and a mouse. The substance of the invention is, however, not dependent on the specific details of the system 10 used to practice the invention.

Because of the distributed nature of modern computing, any combination of the foregoing components can be in communication with other components by means of a network. For example, the printer 18 or the scanner 14 can be remote from the processor 16 and connected to the processor 16 by means of a network.

Although the system 10 is illustrated with the image source 12, 14 and the printer 18 in direct communication with the processor 16, this need not be the case. As a data processing device, the processor 16 only requires input data. It does not matter whether the input data is obtained directly from a hardware device 12, 14, as illustrated in FIG. 1, or whether the input data is provided in the form of a data file stored, for example, on the non-volatile storage element 20. Similarly, since what the processor 16 generates is output data, there is no requirement that the data be provided directly to the printer 18 as illustrated in FIG. 1. The output data can just as easily be stored on the non-volatile storage element 20 and provided to the printer 18 at a later date.

Figure 2:
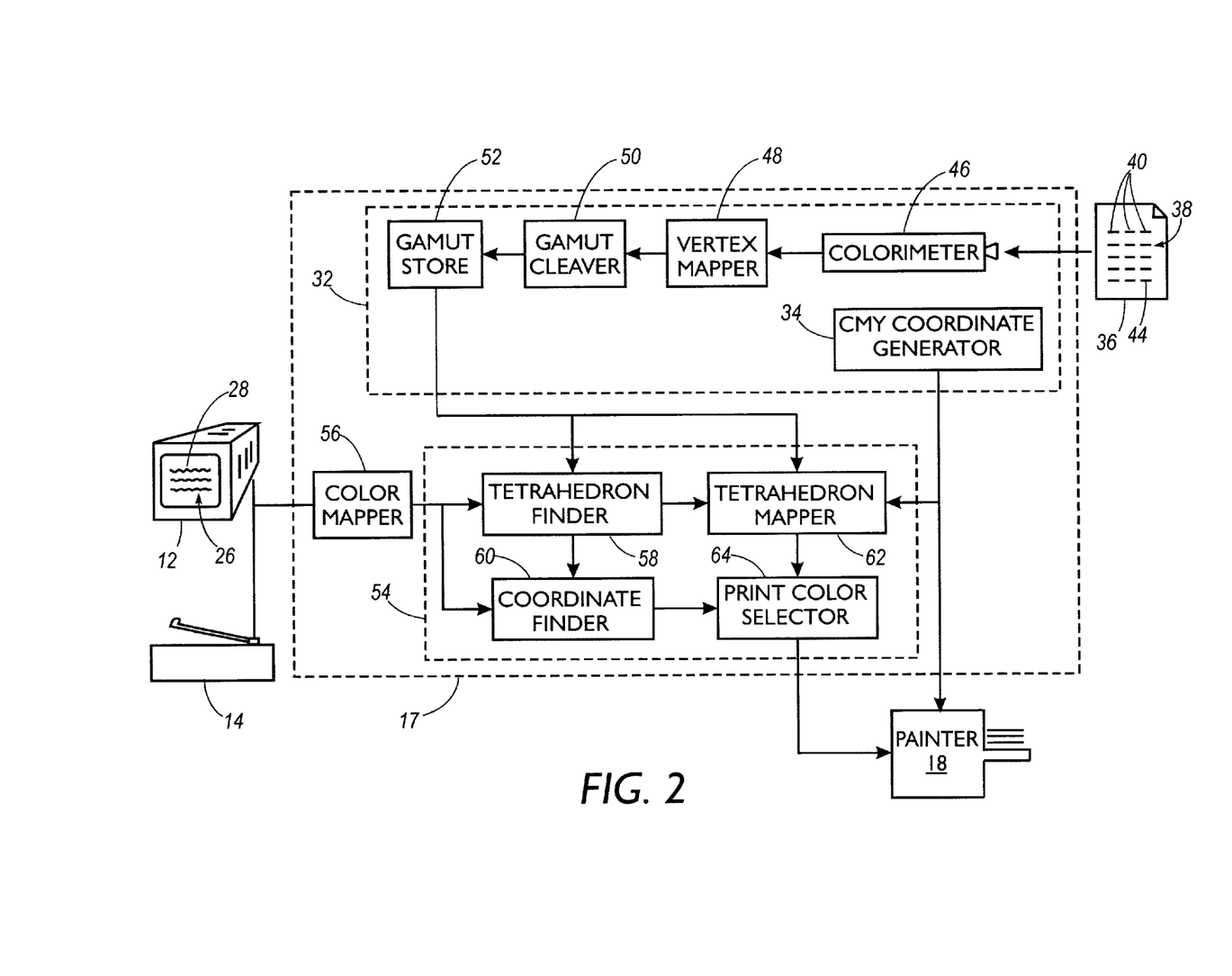
FIG. 2 shows representative architecture for a color-correction system implementing the principles of the invention on the image-reproduction system illustrated in FIG. 1.

FIG. 2 shows the display monitor 12 of FIG. 1 displaying a source image 26 made up of a plurality of image elements 28. Each image element 28 on the source image 26 has a source color represented in terms of source-color coordinates in an. RGB color-space. Also shown in FIG. 2 is the printer 18 of FIG. 1 which is capable of generating printer colors in a CMY color-space. The color-correction system 17 of FIG. 1, shown in more detail in FIG. 2, determines the target-color coordinates in the CMY color-space so as to minimize the perceptible difference between the source color and the target color that results from those target-color coordinates.

The color-correction system 17 includes a printer-gamut transformer 32 that transforms a printer gamut in the subtractive CMY color-space into an equivalent printer-gamut represented in the additive CIEL*a*b* color-space. To accomplish this, the printer-gamut transformer 32 includes a CMY coordinate generator 34 that specifies a plurality of CMY coordinates to be used for imprinting test patches on a print sample 36. These CMY coordinates from the CMY coordinate generator 34 are provided to the printer 18. In response, the printer 18 prints, on the print sample 36, test patches 38 corresponding to the CMY coordinates specified by the CMY coordinate generator 34. These test patches 38 include a plurality of color samples 40 and at least one neutral sample 44.

The printer-gamut transformer 32 further includes a colorimeter 46, or other color measurement device, focused on the print sample 36. For each test patch 38, the colorimeter 46 determines a set of test-patch coordinates in the CIEL*a*b.* color-space that represents the color of the test patch 38. These test-patch coordinates are then provided to a vertex mapper 48.

The vertex mapper 48 generates, in the CIEL*a*b* color-space, a polyhedron having as many vertices as there are color samples 40. The coordinates of each vertex in the polyhedron are selected to be the test-patch coordinates associated with each color sample 40. The neutral sample 44 defines a gray point lying in the interior of the polyhedron on a neutral axis. For convenience, the CMY coordinate generator 34 selects the gray point to be 50%/50%/50% CMY. However, in some cases, the gray point can be selected to be closer to white or closer to black on the neutral axis.

The color samples 40 are selected so that all points reproducible by the printer 18 have color coordinates that lie within the interior of this polyhedron. Conversely all points having color coordinates lying outside this polyhedron are not reproducible by the printer 18. The polyhedron is thus an approximation of the printer gamuts represented in the CIEL*a*b* color-space.

Figure 3:
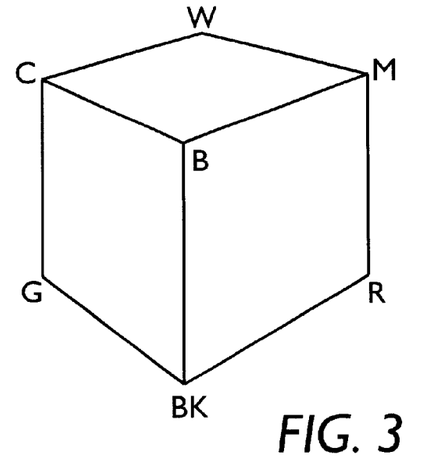
FIG. 3 shows the gamut of the printer in FIG. 1 represented as a cube in CMY space in which the vertices represent full-on combinations of inks.

In a first embodiment, there are fifteen test patches 38, of which fourteen are color samples 40 and one is a neutral sample 44. Eight of the fourteen color samples 40 form the vertices of a cube as shown in FIG. 3. These vertices correspond to color samples for paper white, the full-on single inks cyan, magenta, and yellow, the full-on two-ink combinations resulting in red, green, and blue, and the full-on three-ink combination that results in black.

Three of the remaining six vertices correspond to three combinations in which two inks are mixed at half-on. These vertices correspond to test patches in pink, sky-blue, and mint-green.

The last three vertices correspond to combinations in which two of the inks are half-on and one ink is full-on. These vertices correspond to test patches for brown, teal, and plum.

Figure 4:
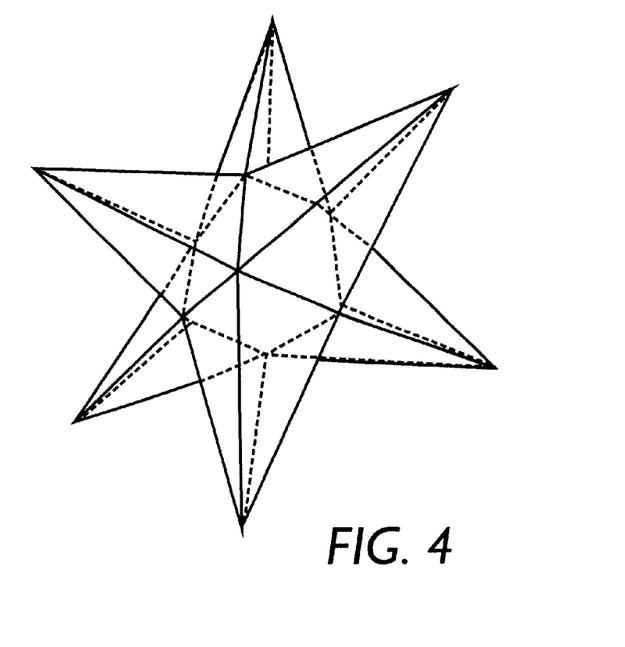
FIG. 4 shows a stellated cube (with the extent of the stellations exaggerated for clarity) that results from providing additional vertices representative of half-on combinations of inks to the cube in FIG. 3.
Figure 5:
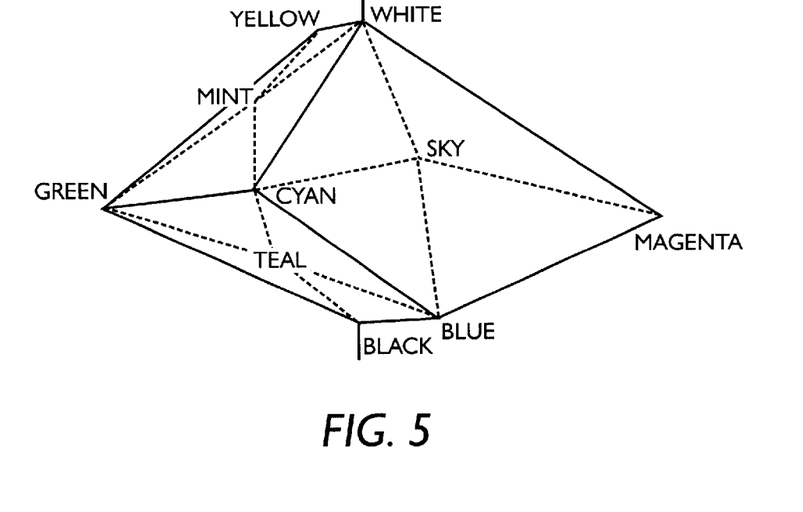
FIG. 5 shows the stellated cube of FIG. 4 following transformation into CIEL*a*b* space.
Figure 6:
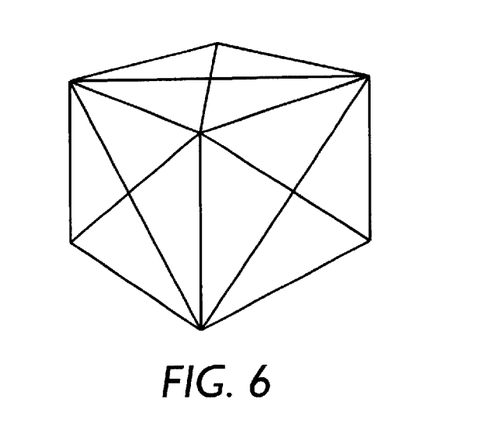
FIG. 6 shows the minimal stellation associated with rotated half-tones.

When connected together, these fourteen points define a stellated cube having twenty-four faces. FIG. 4 shows a stellated cube in CMY space in which the extent of the stellations is exaggerated for clarity. When transformed into CIEL*a*b* space, the stellated cube of FIG. 4 can be distorted, as shown in FIG. 5. The apex of each of the six stellations can be either above the face of the cube, as shown in FIG. 4, or below the face of the cube. The former is referred to as a positive stellation and is associated with dot-off-dot-halftoning. The latter is referred to as negative stellation and is associated with dot-on-dot halftoning. In some cases, as shown in FIG. 6, the stellation is minimal and the printer gamut has a nearly flat face. These cases are associated with rotated halftones.

Figure 7:
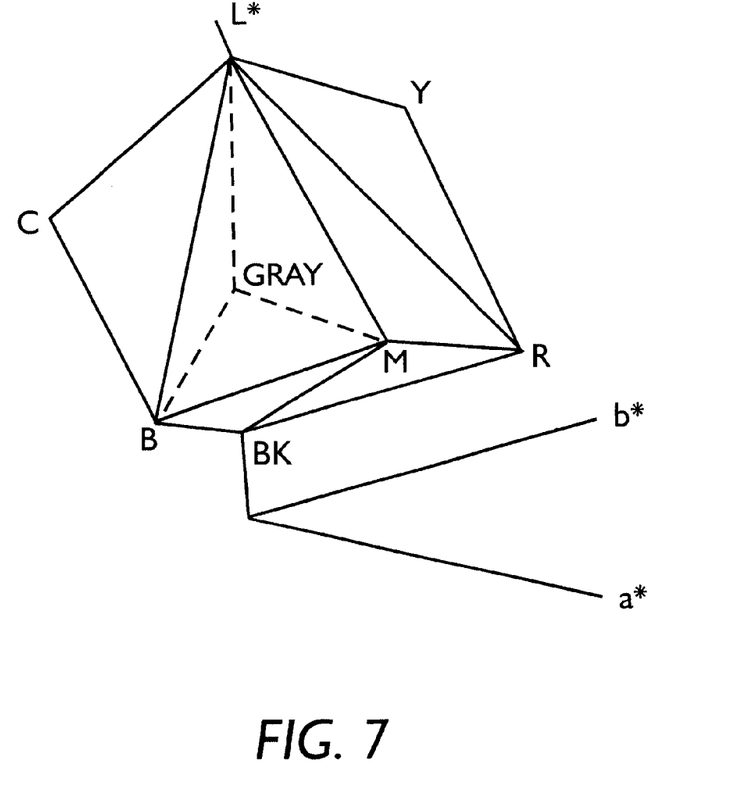
FIG. 7 shows the printer gamut represented by a polyhedron generated with only eight test patches in CIE L*a*b* space.

In a second embodiment, there are nine test patches of which seven are color samples corresponding to the printer colors cyan, magenta, yellow, green, blue, black and red, and one corresponds to paper white. As was the case in the first embodiment, the last test patch is a neutral sample. The resulting polyhedron, which is shown in FIG. 7, is a less refined estimate of the printer gamut than the stellated cube of the first embodiment. However, the computational demands associated with the second embodiment are lighter than those associated with the more refined estimate provided by the first embodiment.

The printer gamut generated by the vertex mapper 48 is then provided to a gamut cleaver 50 that partitions the printer gamut into a plurality of tetrahedra, each of which has a vertex at the gray point. In the case of the first embodiment, this results in the partitioning of the printer gamut into twenty-four tetrahedra, each having a vertex at the gray point and each having a base that forms part of the printer-gamut boundary. In the case of the second embodiment, this results in twelve tetrahedra, each of which likewise has a vertex at the gray point and a base forming part of the printer-gamut boundary. In both embodiments, the resulting tetrahedra are passed from the gamut cleaver 50 to a gamut store 52 where they are saved for use in the color transformation performed by a source-gamut transformer 54.

The display monitor 12 shown in FIG. 2 passes the RGB coordinates of the source color for each image element 28 in the source image 26 to a color mapper 56. The color mapper 56 transforms the RGB color-coordinates for the source color into corresponding CIEL*a*b* coordinates and provides those CIEL*a*b* coordinates to the source-gamut transformer 54.

Figure 8:
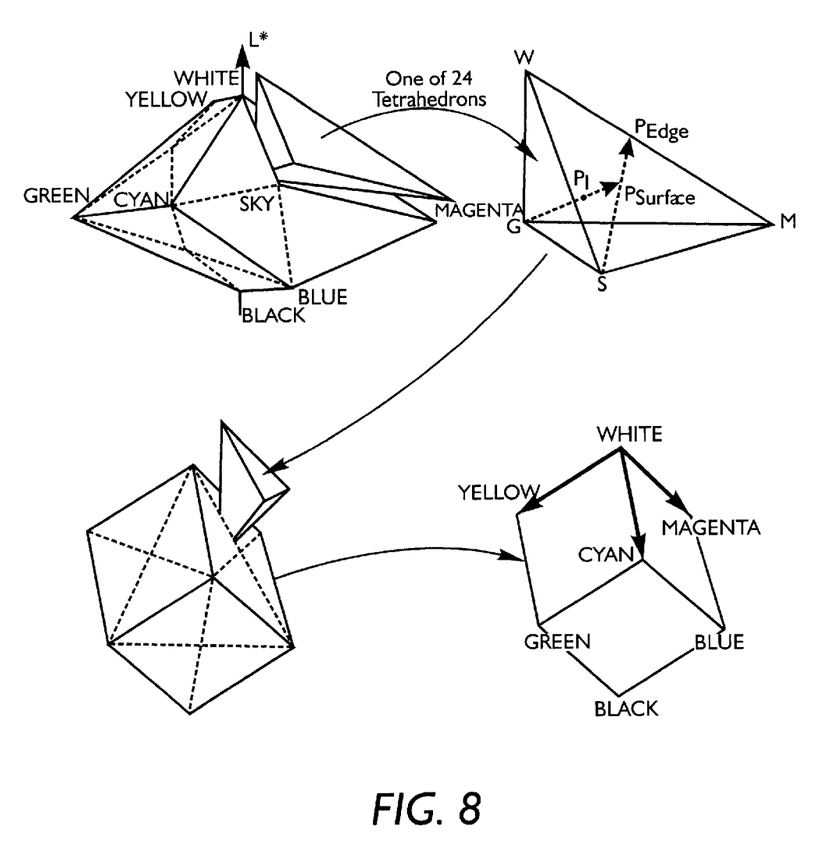
FIG. 8 summarizes the transformations encountered by a source-bearing tetrahedron as it is processed by the color-correction system of FIG. 2.

The source-gamut transformer 54 includes a tetrahedron finder 58 that receives the source-color coordinates from the color mapper 56 and the tetrahedra forming the printer gamut from the gamut store 52. Using this information, the tetrahedron finder 58 identifies the particular tetrahedron in the CIEL*a*b* representation of the printer gamut that contains the source-color coordinates within it. This tetrahedron, referred to as the "source-bearing tetrahedron," is then provided, together with the source-color coordinates, to a coordinate finder 60. FIG. 8 shows an example in which the tetrahedron finder 58 has identified the source-bearing tetrahedron as being bounded by the vertices for white, sky-blue, magenta, and gray (not visible).

Using the source-color coordinates and the source-bearing tetrahedron, the coordinate finder 60 determines the barycentric coordinates of the source color relative to the source-bearing tetrahedron. As illustrated in the upper-right quadrant of FIG. 8, these barycentric coordinates locate the source color relative to the vertices of the source-bearing tetrahedron.

The source-bearing tetrahedron, in which all coordinates are in CIEL*a*b* color-space, is also provided to a tetrahedron mapper 62 for transformation into a corresponding tetrahedron in which all coordinates are in the CMY color-space. In order to accomplish this, the tetrahedron mapper 62 needs to know the CMY coordinates corresponding to the CIEL*a*b* coordinates of the source-bearing tetrahedron. These CMY coordinates are available from the CMY coordinate generator 34 which provided those same CMY coordinates to the printer 18 in connection with generating the print sample 36 from which the CIEL*a*b* coordinates for all the tetrahedra, including the source-bearing tetrahedron, were derived. This step is illustrated in FIG. 8 by the arrow from the upper right to the lower left of the figure.

The output of the tetrahedron mapper 62 is the tetrahedron in CMY color-space that corresponds to the source-bearing tetrahedron. However, this tetrahedron, which we refer to as the "target-bearing tetrahedron," contains many other colors besides the target color. As a result, knowledge of the target-bearing tetrahedron alone is insufficient to specify the target color that is the perceptual equivalent of the source color. The additional step of selecting the CMY coordinates from the source-bearing tetrahedron is performed by a print color selector 64. The print color selector 64 combines the barycentric coordinates generated by the coordinate finder 60 with the CMY coordinates of the vertices of the source-bearing tetrahedron, as provided by the tetrahedron mapper 62, to generate the CMY coordinates for the source color. This step, which is represented by the arrow from the lower left to the lower right of FIG. 8, is readily accomplished by identifying a point in the target-bearing tetrahedron that has the same barycentric coordinates as the source color in the source-bearing tetrahedron. The coordinates of this point, which are CMY coordinates, form the output of the source-gamut transformer 54. These coordinates can be sent directly to the printer 18 to print the target color that reproduces the desired source color, or to an intermediate stage that generates the black separation from the CMY coordinates.

In some cases, the source gamut to be reproduced contains source colors that are outside the printer gamut and therefore cannot be reproduced by any combination of printer inks. When this occurs, the tetrahedron finder 58 fails to identify a tetrahedron containing the source color within its boundaries. This requires that gamut compression be performed in order to map each source color in the source gamut to a color that can be reproduced by the printer. The gamut compression process is thus a mapping between a first—CIE L*a*b* space containing the printer gamut to a second CIE L*a*b* space containing a compressed printer-gamut.

To begin the process of gamut compression, the tetrahedron finder 58 determines a ray extending from the gray point to the source color. Because the gray point is within the printer gamut, this ray passes through one of the tetrahedra on its way to the source color. This tetrahedron, through which the ray passes, is designated as the source-bearing tetrahedron.

The source-bearing tetrahedron, like all the other tetrahedra, has four vertices defining six edges. Three of these edges have the gray point as one of their defining vertices. The tetrahedron finder 58 extends these three edges by a predetermined amount in the direction away from the gray point. These three extended edges thus extend from the gray point to a point outside the printer gamut.

Figure 9:
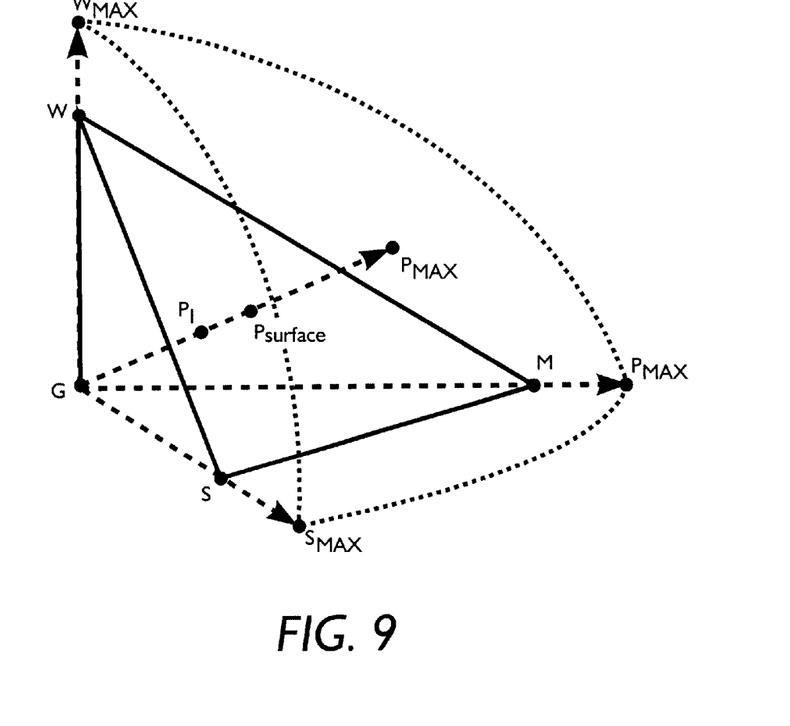
FIG. 9 shows the geometry for compression of one constituent tetrahedron from the gamut of FIG. 8.
Figure 10:
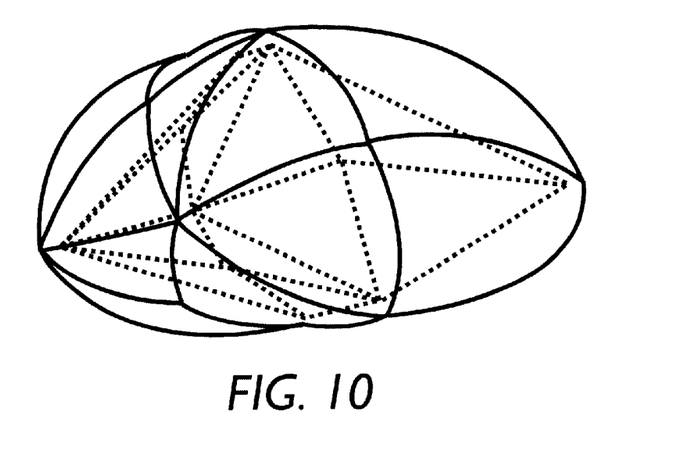
FIG. 10 shows a maximum envelope surface for gamut compression.

FIG. 9 shows an example in which the source-bearing tetrahedron has vertices at sky-blue, white, magenta, and of course, gray. Note that the edge extending from gray to white is extended by a predetermined amount to a new color $W_{max}$. Similarly, the edges extending from gray to sky-blue and from gray to magenta have been extended by a preselected amount to new colors $S_{max}$ and $M_{max}$ respectively. This pre-selected amount is such that most feasible source colors are contained within the maximum surface envelope. These three new colors, which are not within the printer gamut, define a spherical triangle as shown by the dotted line in the FIG. 9. Similar spherical triangles associated with the remaining tetrahedra define a maximum surface envelope surrounding the gamut as shown in FIG. 10.

This maximum surface envelope, together with the three planes defined by the points GSW, GMS, and GWM, define a spherically convex volume in color-space. The union over all tetrahedra of these convex volumes contains those source colors that are to be mapped into the compressed printer-gamut using the gamut compression method of the invention. Source colors that lie outside these convex volumes are not compressed and are simply clipped or truncated to the gamut boundary.

In carrying out the gamut compression method of the invention, the print-color selector 64 constructs a ray containing the gray point and extending to each target color that is within the convex volume. One such ray is shown in FIG. 9. This ray passes through the target color, intersects the printer gamut boundary, and intersects the maximum surface envelope. In the case in which the target color lies outside the printer gamut but within the convex volume, the ray would intersect the printer gamut boundary before passing through the target color. In either case, the gamut compression method of the invention operates in the same manner.

The target color, the intersection with the maximum surface envelope, and the intersection with the printer gamut boundary are designated in FIG. 9 as $P_1$, $P_{max}$, and $P_{surface}$ respectively. The print-color selector 64 then constructs a compression function. In the preferred embodiment, the compression function is a fourth-degree polynomial in the variable defined by the ratio of the distance between the target color and the gamut boundary to the distance between the target color and the maximum surface envelope. To facilitate the discussion, we define this variable as:

$$r = \frac{|P_1 - G|}{|P_{max} - G|}$$

The five coefficients of this fourth-degree polynomial are selected to satisfy the following boundary conditions:
(1) the polynomial maps the gray point in the printer gamut to the gray point of the compressed gamut;
(2) the first derivative of the polynomial is 1 at the gray point, thereby ensuring that the compression is linear near the gray point;
(3) the second derivative of the polynomial is 0 at the gray point, thereby permitting an extra degree of linearity near the gray point;
(4) the polynomial maps $P_{max}$ to the boundary of the compressed printer-gamut at $P_{surface}$; and
(5) the second derivative of the polynomial at the compressed printer-gamut boundary is zero, thereby creating a smooth approach to the printer gamut boundary but with increasing compression.

Figure 11:
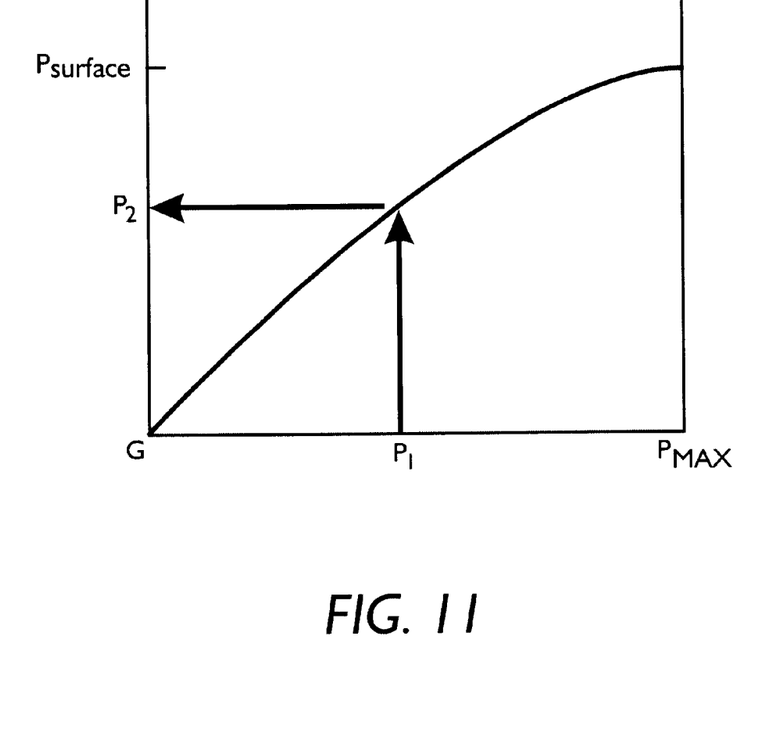
FIG. 11 shows a typical compression function for use in the gamut compression method of the invention.

FIG. 11 shows an example of a fourth-degree polynomial used to perform gamut compression in accord with the principles of the invention. The horizontal axis represents target colors to be mapped into the compressed printer-gamut and the vertical axis represents the corresponding colors in the compressed printer-gamut. Note that the print color selector 64 maps the source color at the maximum surface envelope to the surface of the compressed printer-gamut. Target colors beyond the maximum surface envelope are truncated by mapping them to the intersection of the surface of the compressed printer-gamut with a ray extending from the gray point to the target color.

In the event that the compression specified by the polynomial is so great that the first derivative is negative at the maximum surface envelope, the fifth boundary condition specified above is changed to specify that the first derivative of the polynomial be zero at the maximum surface envelope.

Figure 12:
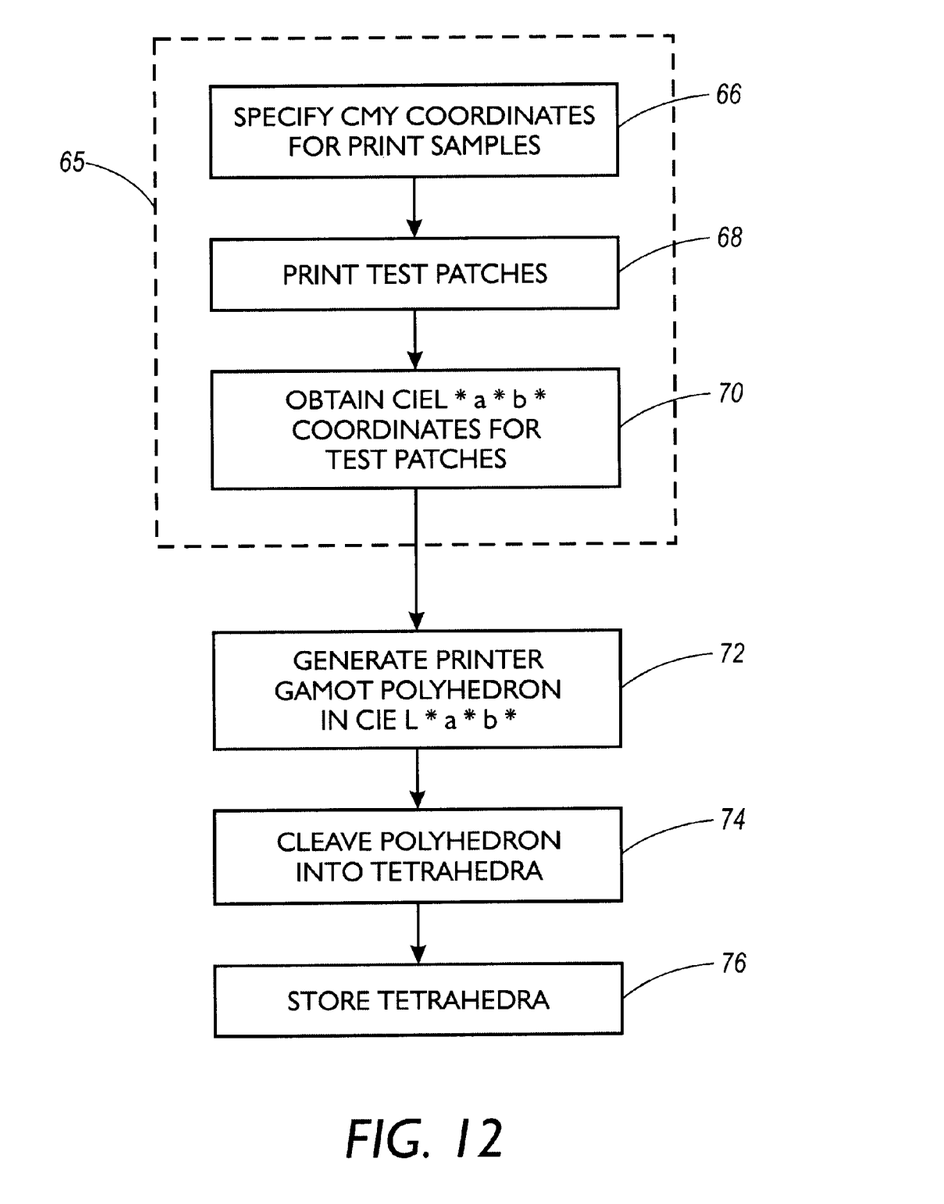
FIG. 12 is a flow-chart illustrating the method executed by the color-correction system of FIG. 2 to generate an equivalent printer-gamut in CIEL*a*b* space from the printer gamut in CMY space.
Figure 13:
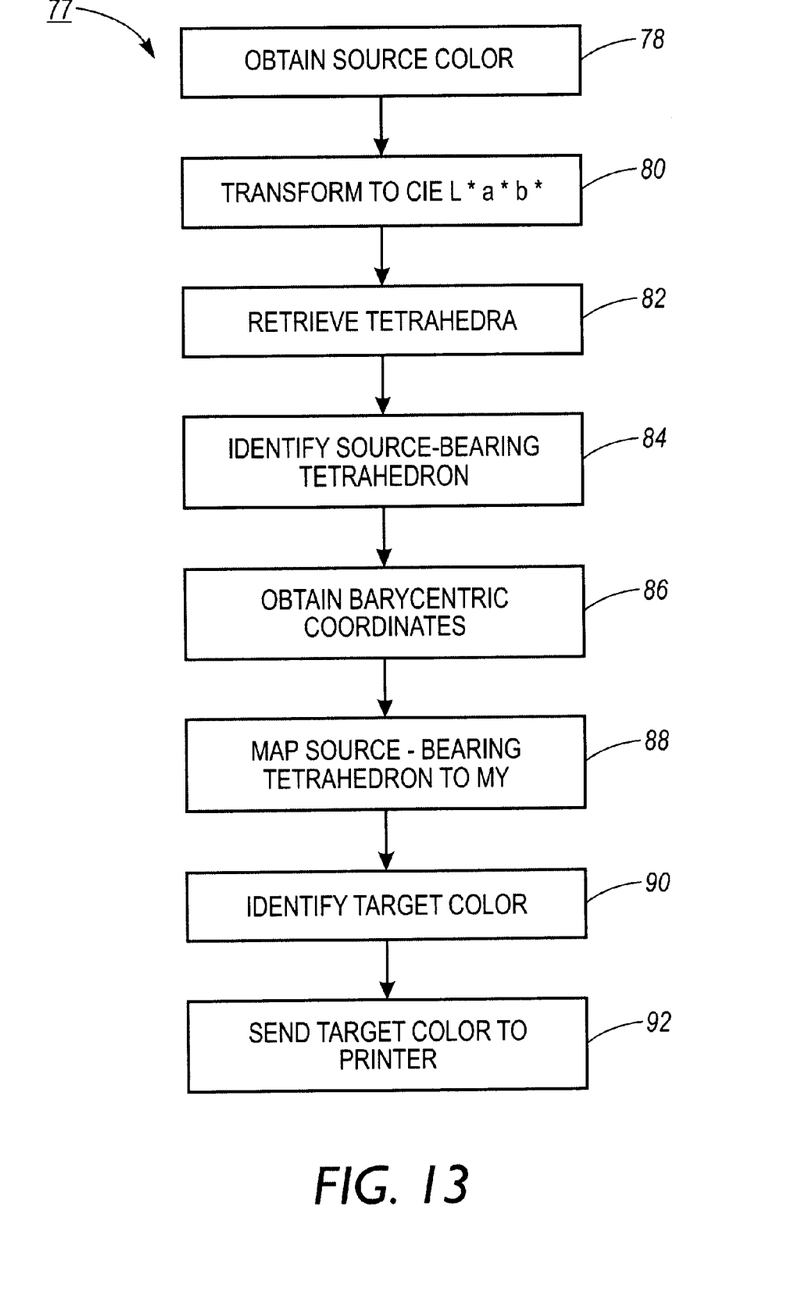
FIG. 13 is a flow-chart illustrating the method executed by the color-correction system of FIG. 2 to derive the CMY coordinates corresponding to the source color in CIEL*a*b* space.

It is apparent that the method implemented by the system of FIG. 2 can be divided into a series of steps for generating the tetrahedra that form the CIEL*a*b* representation of the printer gamut, as shown in FIG. 12, and a series of steps in which these tetrahedra are used to identify the CMY coordinates of a target color that best represents a CIEL*a*b* source color, as shown in FIG. 13. The steps shown in FIG. 12 are executed relatively infrequently, and generally only in connection with printer calibration. The steps shown in FIG. 13 are executed for each image element in the image, and are therefore executed far more frequently.

Referring now to FIG. 12, a method for generating the tetrahedra representative of the printer gamut in CIEL*a*b* space begins with the step of obtaining the CMY coordinates of the vertices of the printer gamut and transforming them into CIEL*a*b* coordinates (step 65). This is accomplished by specifying the CMY coordinates to be used for generating a print sample (step 66) and instructing a printer to print test patches containing those CMY coordinates (step 68). These test patches are then scanned by a colorimeter to generate CIEL*a*b* coordinates corresponding to each test patch (step 70).

The CIEL*a*b* coordinates for each test patch are then used to define a polyhedron representative of the printer gamut in CIEL*a*b* space (step 72). This polyhedron is divided into a plurality of tetrahedra, each of which has a vertex at a common neutral point and a face forming part of the printer gamut boundary (step 74). The resulting tetrahedra are then stored for later use in connection with the operation of the color-correction module (step 76).

Referring now to FIG. 13, a method 77 for using the tetrahedra generated and stored by the method illustrated in FIG. 12 includes the steps of obtaining a source color that is to be printed (step 78) and transforming that source color into CIEL*a*b* space (step 80). This is followed by the steps of retrieving the tetrahedra stored at the completion of the method shown in FIG. 12 (step 82), identifying a source-bearing tetrahedron that includes the source point (step 84), and obtaining barycentric coordinates of the source color relative to the vertices of the source-bearing tetrahedron (step 86).

Once the source-bearing tetrahedron is identified, it is transformed into an equivalent representation in CMY space using the CMY coordinates generated in connection with printing the test patches in the method illustrated in FIG. 12 (step 88). We refer to the CMY representation of the source-bearing tetrahedron as the target-bearing tetrahedron. The target-bearing tetrahedron include within it a target point that corresponds to the source color. Once the target-bearing tetrahedron is formed, there remains the step of identifying this target point within the target-bearing tetrahedron that corresponds to the source color (step 90). This is best accomplished by identifying the point in the target-bearing tetrahedron that has the same, barycentric coordinates as the source point in the source-bearing tetrahedron. This point defines the CMY coordinates corresponding to the source point and sends it to the printer (step 92). While the preferred embodiment uses barycentric coordinates to determine the CMY coordinates of the source point, those coordinates can also be determined on the basis of an arbitrary function specific to the source-bearing tetrahedron. Such arbitrary functions can readily be derived by printing additional test patches corresponding to colors in the interior or edges of the source-bearing tetrahedron. This additional color information can be used to optimize the arbitrary function for the particular source bearing tetrahedron. A well-known example of such optimization involves the use of a least-squares fit.

Figure 14:
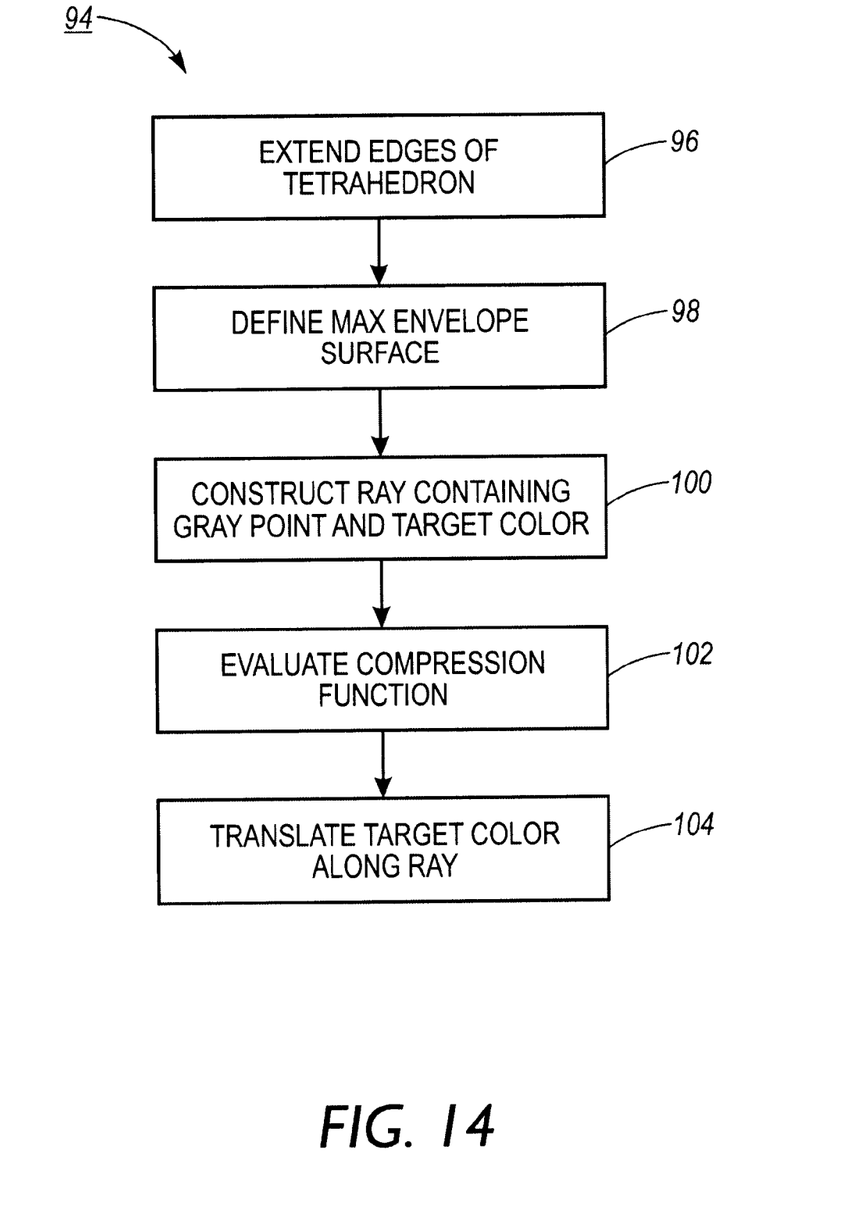
FIG. 14 is a flow-chart illustrating the method executed by the color-correction system of FIG. 2 to compress the printer gamut.

FIG. 14 shows the steps in the creating the compressed printer-gamut according to the method 94 of the invention. The method includes the step of extending the edges of the target tetrahedron (step 96) and thereby defining a maximum envelope surface (step 98). Colors lying outside the maximum envelope surface are not mapped to the compressed printer-gamut and are instead clipped to the surface of the compressed printer-gamut. The target colors are then transformed into a spherical coordinate system centered at the gray point so that a ray can conveniently be defined between the gray point and the target color to be mapped into the compressed printer-gamut (step 100). This step is followed by the step of evaluating the compression function (step 102) and applying the compression function to the target color, thereby translating the target color along the ray (step 104).

Having described the invention and a preferred embodiment thereof, what we claim as new and secured by Letters Patent is:

1. A color correction system for identifying a target color from a printer gamut in a subtractive color-space that corresponds to a source color in a source color-space, said system comprising:
    a gamut transformation module adapted to convert said printer gamut into an equivalent gamut in said source color-space, said equivalent gamut having a plurality of non-overlapping constituent volumes, said constituent volumes sharing a common boundary point;
    a volume finder having access to said plurality of constituent volumes and to said source color, said volume finder adapted to identify a source-bearing volume from said plurality of constituent volumes;
    a volume mapper for matching a target-bearing volume in said printer gamut in said subtractive color-space with said source-bearing volume in said equivalent gamut in said source color space; and
    a coordinate mapper for determining a target color in said target-bearing volume that corresponds to said source color in said source-bearing volume.

2. The system of claim 1 wherein said gamut transformation module comprises a gamut cleaver adapted to partition said equivalent gamut into said plurality of non-overlapping constituent volumes.

3. The system of claim 2 wherein said gamut cleaver comprises partitioning means for partitioning said equivalent gamut into a plurality of tetrahedra, each of said tetrahedra having a common vertex interior to said equivalent gamut.

4. The system of claim 3 wherein said gamut cleaver comprises selection means for selecting said common vertex to be on a neutral axis in said equivalent gamut.

5. The system of claim 3 wherein said partitioning means comprises means for selecting the number of tetrahedra to be at least twelve.

6. The system of claim 3 wherein said partitioning means comprises means for selecting the number of tetrahedra to be at least twenty-four.

7. The system of claim 1 wherein said gamut transformation module comprises a calorimeter configured to view a print sample having a plurality of test patches imprinted thereon.

8. A color correction system for identifying a target color from a printer gamut in a subtractive color-space that corresponds to a source color in a source color-space, said system comprising:
    a gamut transformation module adapted to convert said printer gamut into an equivalent gamut in said source color-space, said equivalent gamut having a plurality of non-overlapping constituent volumes, said constituent volumes sharing a common boundary point;
    a volume finder having access to said plurality of constituent volumes and to said source color, said volume finder adapted to identify a source-bearing volume from said plurality of constituent volumes;
    a volume mapper for matching a target-bearing volume in said printer gamut in said subtractive color-space with said source-bearing volume in said equivalent gamut in said source color space; and
    a coordinate mapper, which comprises barycentric mapping means for determining barycentric coordinates of said source color relative to said source-bearing volume for determining a target color in said target-bearing volume that corresponds to said source color in said source-bearing volume.

9. The system of claim 8 wherein said coordinate mapper further comprises means for identifying a point in said target volume having barycentric coordinates relative to said target volume that are equivalent to said barycentric coordinates of said source color relative to said source-bearing volume.

10. A color correction system for identifying a target color from a printer gamut in a subtractive color-space that corresponds to a source color in a source color-space, said system comprising:
    a gamut transformation module adapted to convert said printer gamut into an equivalent gamut in said source color-space, said equivalent gamut having a plurality of non-overlapping constituent volumes, said constituent volumes sharing a common boundary point;
    a volume finder having access to said plurality of constituent volumes and to said source color, said volume finder adapted to identify a source-bearing volume from said plurality of constituent volumes;
    a volume mapper for matching a target-bearing volume in said printer gamut in said subtractive color-space with said source-bearing volume in said equivalent gamut in said source color space; and
    a coordinate mapper for determining a target color in said target-bearing volume that corresponds to said source color in said source-bearing volume, which comprises a gamut compressor for generating a compressed printer-gamut, said gamut comprising:
        print selection means defining a ray extending between said common boundary point and said target color; and
        compression means for translating said target color toward said common boundary point along said ray.

11. The system of claim 10 wherein said compression means comprises compression function means for determining a distance through which said target color is to be translated along said ray, said distance being dependent on a separation between said common boundary point and said source color.

12. The system of claim 11 wherein said compression function means comprises means for evaluating a fourth-degree polynomial mapping function.

13. A method for identifying a target color from a printer gamut in a subtractive color-space that corresponds to a source color in a source color-space, said method comprising the steps of:
    transforming said printer gamut into an equivalent gamut in said source color-space;
    said equivalent gamut having a plurality of non-overlapping constituent volumes, said constituent volumes sharing a common boundary point;

identifying a source-bearing volume from said plurality of constituent volumes;

matching a target-bearing volume in said printer gamut in said subtractive color-space with said source-bearing volume in said equivalent gamut in said source color-space; and determining a target color in said target-bearing volume that corresponds to said source color in said source-bearing volume.

14. The method of claim 13 wherein said transforming step comprises the step of partitioning said equivalent gamut into a plurality of tetrahedra, each of said tetrahedra having a common vertex interior to said equivalent gamut.

15. The method of claim 14 further comprising the step of selecting said common vertex to be on a neutral axis in said equivalent gamut.

16. The method of claim 14 wherein said partitioning step comprises the step of selecting the number of tetrahedra to be at least twelve.

17. The method of claim 14 wherein said partitioning step comprises the step of selecting the number of tetrahedra to be at least 24.

18. The method of claim 13 wherein the step of transforming said printer gamut comprises the step of performing a colorimetric measurement of a print sample having a plurality of test patches imprinted thereon.

19. A method for identifying a target color from a printer gamut in a subtractive color-space that corresponds to a source color in a source color-space, said method comprising the steps of:

transforming said printer gamut into an equivalent gamut in said source color-space;

said equivalent gamut having a plurality of non-overlapping constituent volumes, said constituent volumes sharing a common boundary point;

identifying a source-bearing volume from said plurality of constituent volumes;

matching a target-bearing volume in said printer gamut in said subtractive color-space with said source-bearing volume in said equivalent gamut in said source color-space; and determining a target color in said target-bearing volume that corresponds to said source color in said source-bearing volume by determining barycentric coordinates of said source color relative to said source-bearing volume.

20. The method of claim 19 wherein said step of determining said target color comprises the step of identifying a point in said target volume having barycentric coordinates relative to said target volume that are equivalent to said barycentric coordinates of said source color relative to said source-bearing volume.

21. A method for identifying a target color from a printer gamut in a subtractive color-space that corresponds to a source color in a source color-space, said method comprising the steps of;

transforming said printer gamut into an equivalent gamut in said source color-space;

said equivalent gamut having a plurality of non-overlapping constituent volumes, said constituent volumes sharing a common boundary point;

identifying a source-bearing volume from said plurality of constituent volumes;

matching a target-bearing volume in said printer gamut in said subtractive color-space with said source-bearing volume in said equivalent gamut in said source color-space; and determining a target color in said target-bearing volume that corresponds to said source color in said source-bearing volume by defining a ray extending between said common boundary point and said target color, and translating said target color toward said common boundary point along said ray.

22. The method of claim 21 further comprising the step of determining, on the basis of a separation between said common boundary point and said source color, a distance through which said target color is to be translated along said ray.

23. The method of claim 22 wherein said distance determining step comprises the step of evaluating a fourth-degree polynomial mapping function.

* * * * *